United States Patent [19]

Takamatsu et al.

[11] Patent Number: 4,475,614
[45] Date of Patent: Oct. 9, 1984

[54] COMBINATION METER COVER CONSTRUCTION

[75] Inventors: Masahiro Takamatsu; Masaaki Yamada, both of Toyota, Japan

[73] Assignee: Toyota Jidosha Kabushiki Kaisha, Toyota, Japan

[21] Appl. No.: 471,345

[22] Filed: Mar. 2, 1983

[30] Foreign Application Priority Data

Jul. 1, 1982 [JP] Japan .................. 57-099895[U]

[51] Int. Cl.³ ............................................. B60K 37/00
[52] U.S. Cl. ...................................... 180/90; 296/70; 280/752
[58] Field of Search ............... 180/90; 296/70, 71, 296/72, 73, 74; 280/752

[56] References Cited

U.S. PATENT DOCUMENTS

| | | | |
|---|---|---|---|
| 3,341,248 | 9/1967 | Barenyi et al. | 180/90 |
| 3,910,371 | 10/1975 | Magrini | 180/90 |
| 4,373,745 | 2/1983 | Matsuno | 180/90 |
| 4,418,377 | 11/1983 | Tamuro | 180/90 |

*Primary Examiner*—Richard A. Bertsch
*Attorney, Agent, or Firm*—Oblon, Fisher, Spivak, McClelland & Maier

[57] ABSTRACT

A transparent cover provided at the forward portion of a meter case is covered at the front surface of the upper portion thereof with a meter hood and connected at the lower portion thereof with an opaque meter cluster, thus avoiding an impression that an indicating portion of the meter case is disposed in a secluded position so that meters can be readily inspected.

19 Claims, 6 Drawing Figures

COMBINATION METER COVER CONSTRUCTION

BACKGROUND OF THE INVENTION

1. Field of the Invention

This invention relates to a combination meter cover construction for covering a combination meter such as a speedometer and the like in an instrument panel for use in a vehicle such as an automobile.

2. Description of the Prior Art

While being covered by a meter cluster or an instrument cluster secured to a meter hood, a meter covering of an automobile is given a construction such that various meters provided therein may be readily inspected.

This conventional construction will now be described with reference to FIG. 1. A transparent cover 14 solidly secured to the forward portion of a meter case 10 is opposed to a meter cluster 18 mounted on a meter hood 16, for covering an analogue or digital type pointer 12. This meter cluster 18 is formed with an opening 20. Careful consideration in design and construction allows the pointer to be readily inspected due to the fact that the marginal portion of the transparent cover 14 is covered by the peripheral edge portion of this opening 20 so that unnecessary portions between the meter hood 16 and the pointer 12 cannot be seen by a driver.

Meter cluster 18 is formed separately from the meter case 10 and the meter cluster 18 is secured to the transparent cover 14 by a gap of 2 to 3 mm. With this arrangement, the pointer 12 is disposed in a secluded position as viewed from the driver, and further, the positional relationship in mounting between the meter cluster 18 and the transparent cover 14 is not definitely settled, whereby the positional relationship between the opening 20 of the meter cluster 18 and the pointer 12 is not determined so that the pointer 12 and its surroundings cannot be arranged in a clean-cut shape. Moreover, as the case may be, the meter cluster 18 and the transparent cover 14 may develop a mechanical interference, thus resulting in the generation of noises.

SUMMARY OF THE INVENTION

The present invention has been developed to obviate the above-described disadvantages of the prior art and has as its object the provision of a combination meter cover construction capable of arranging the pointer and its surroundings in a clean-cut shape as viewed from the driver and eliminating the source of generation of noises and the like.

In the combination meter cover construction according to the present invention, an opaque meter cluster is secured to the lower portion of the front surface of the meter case to cover the lower portion of the front surface of the meter case, whereby generation of noises due to a mechanical interference between the meter cluster and the main body of meter is prevented. As for the upper portion of the front surface of the meter case, the meter hood is disposed close to the upper portion of the transparent cover to cover the transparent cover and its surroundings in cooperation with the opaque meter cluster, whereby the pointer and its surroundings in the meter case are arranged to have a clean-cut shape.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENT

Figure 2:
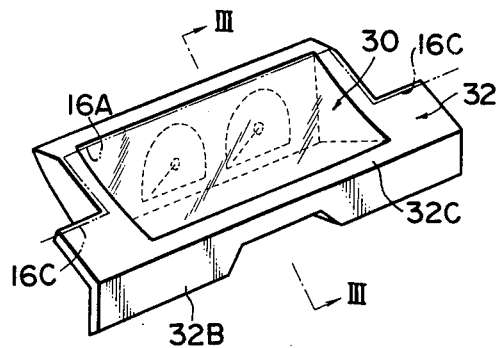
FIG. 2 is a perspective view showing an embodiment of the combination meter cover construction according to the present invention.
Figure 3:
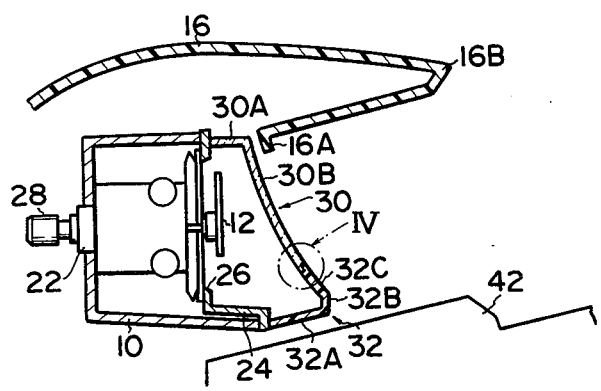
FIG. 3 is a sectional view taken along the axial line of an automobile, corresponding to a sectional view taken along the line III—III in FIG. 2.

FIGS. 2 and 3 show the combination meter cover construction in accordance with the present embodiment. A meter case 10 is of the box form being open forwardly in a direction of a driver (i.e to the right in FIG. 3), and incorporates therein a main body of meter 22.

A decorative plate 24 is solidly secured to the open end portion of this meter case 10, and one end of the main body of meter 22 is affixed to the peripheral edge portion of an opening 26 formed in this decorative plate 24, whereby a pointer 12 of the main body of meter 22 is disposed in the opening 26 formed in the decorative plate 24 so that an occupant of the vehicle can visually inspect the pointer 12.

The other end of the main body of meter 22 is formed to provide an input portion 28 extending through the rear surface of the meter case 10. This input portion 28 is connected to a sensor (not shown) and adapted to rotate the pointer 12 in proportion to the vehicle speed, engine rotational speed or the like.

A transparent cover 30 is provided on the front surface of the meter case 10, for covering the pointer 12. As shown in FIG. 3, this transparent cover 30 comprises a horizontal rectilinear portion 30A solidly secured to the meter case 10 through the decorative plate 24 and an inclined portion 30B extending from the forward end portion of this horizontal rectilinear portion 30A into a compartment, forming a moderate curve obliquely downwardly. This inclined portion 30B has a curvature not directing a reflected light toward the occupant so that the operation of the occupant visually inspecting the meters may not be disturbed by the reflected light.

In this embodiment, the bottom end portion and opposite side portions of the transparent cover 30 are secured to an opaque meter cluster 32. This opaque meter cluster 32 is solidly secured to the meter case 10 through the decorative plate 24 and of a substantially U-shaped as viewed from the driver, so as to cover the lower portion and opposite side portions of the transparent cover 30 as shown in FIG. 2. In consequence, this opaque meter cluster 32, in the cross sectional view as shown in FIG. 3, comprises a substantially horizontal rectilinear portion 32A affixed at one end thereof to the meter case 10 through the decorative plate 24, a vertical rectilinear portion 32B substantially vertically erected from the forward end portion of this horizontal rectilinear portion 32A and an inclined portion 32C obliquely upwardly erected from the top end portion of this vertical rectilinear portion 32B.

The top end portion of this inclined portion 32C is connected to the bottom end portion of the inclined portion 30B of the transparent cover 30, whereby each of the inclined portions 32C also 30B have identical curvatures.

Figure 4:
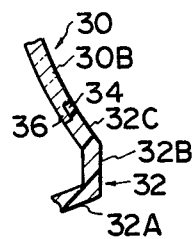
FIG. 4 is a sectional view showing the connected portion between the transparent cover and the opaque meter cluster as illustrated in a portion IV of FIG. 3.

As shown in FIG. 4, the inclined portion 32C and the inclined portion 30B of the transparent cover 30 are joined together by a rebated joint. More specifically, a rectangular cutout is formed at the side of the main body of meter of the top end portion of the inclined portion 32C, whereby a small wall thickness projection 34 is formed at the top end portion of the inclined portion 32C. A rectangular cutout is formed at the side of the compartment of the bottom end portion of the inclined portion 30B, whereby a small wall thickness projection 36 is formed. These small wall thickness projections 34 and 36 are joined together, whereby the inclined portions 30B and 32C cooperate in presenting a moderate curved surface with no variation presented in thickness.

This connected portion formed between the inclined portions 30B and 32C may be formed integrally. It is conceivable to effect this integral formation by an insert molding or a two-color molding. However, when the transparent cover 30 is made of acrylic resin and the opaque meter cluster 32 is made of ABS resin, it is preferable to adopt the two-color molding in consideration of molding strain. The forward end portion 16A of the meter hood 16 is opposed to the front of the top end portion of the transparent cover 30. A turned-back portion 16B of this meter hood 16 projects into the compartment to cover the front of the upper portion of the transparent cover 30, so that the direct sunlight can be prevented from passing through the transparent cover 30.

The forward end portion 16A of this meter hood 16 is spaced a slight distance apart from the front surface of the top end portion of the transparent cover 30, whereby consideration is given that the top end portion of the transparent cover 30 is covered so as not to allow other parts to be seen through a gap between the meter hood 16 and the transparent cover 30 which would otherwise be formed.

This meter hood 16 has suspended portions 16C indicated by two-dot chain lines in FIG. 2, which are disposed close to the top end portion and side portions of the meter cluster 32, whereby the parts located behind the instrument panel can be shielded from the line of vision of the occupant. Additionally, reference numeral 42 in FIG. 3 denotes a steering column.

Figure 1:
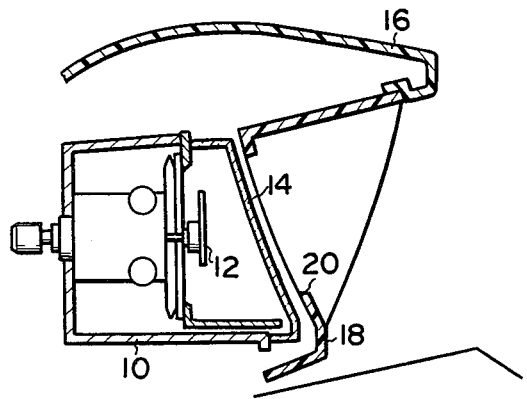
FIG. 1 is a sectional view taken along the axial line of an automobile, showing the conventional combination meter cover construction.

As described above, in the combination meter cover construction in accordance with the present embodiment, the opaque meter cluster 32 is integrally secured to the transparent cover 30 to cover the lower portion of the transparent cover 30, and the upper portion of the transparent cover 30 is covered by the meter hood 16, whereby such an impression that the pointer 12 of meter is disposed in a secluded position is avoided, because the meter cluster 18 would otherwise be disposed forwardly of the transparent cover 14 as in the prior art as shown in FIG. 1, so that the meter cluster 32 and the transparent cover 30 can become coplanar with each other to allow the pointer 12 of the meter 22 to be inspected over a wide range, thus achieving a so-called coplanar design. In assembly the meter cluster 32 is secured to the meter case 10 integrally with the transparent cover 30, so that the number of man-hours required for assembly can be decreased, thereby enabling a reduction in production costs. Further, the meter cluster 32 and the transparent cover 30 do not move relative to each other, thereby enabling prevention of the generation of noises.

The aforesaid transparent cover 30 and meter cluster 32 may be made of any of a number of various synthetic resins. The meter cluster 32 need not necessarily be made of ABS resin, but instead may be made of acrylic resin similar to the transparent cover 30. Furthermore, securing of the transparent cover 30 to the meter cluster 32 need not necessarily be limited to the above-described construction, but may be replaced by any of various constructions.

In addition, in the above-described embodiment, such an arrangement is adopted that the opposite sides of the transparent cover 30 are covered by the opaque meter cluster 32, but this instead may be replaced by an arrangement wherein the suspended portions 16C of the meter hood 16 may be extended to the opposite sides of the transparent cover 30 to cover the same.

Figure 5:
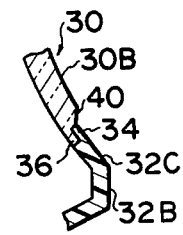
FIGS. 5 and 6 are sectional views showing the connected portions between the transparent cover and the opaque meter cluster in accordance with second and third embodiments of the invention, respectively.
Figure 6:
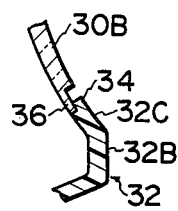

FIGS. 5 and 6 show the mounting constructions in accordance with the second and the third embodiments, respectively.

FIG. 5 shows a mounting construction preferable when the transparent cover 30 is greater in wall thickness than the opaque meter cluster 32, in which construction a chamfered portion 40 is formed at the bottom end portion of the transparent cover 30, whereby after the wall thickness of the transparent cover 30 has been substantially decreased, the small wall thickness projection 36 is formed.

Furthermore, in FIG. 6, a gap is formed between the forward end portion of the small wall thickness projection 34 of the opaque meter cluster 32 and the bottom portion of the rectangular cutout of the transparent cover 30, whereby a different impression of design is given to the occupant. Paint or similar materials may be used to fill in the aforesaid gap.

Additionally, the meter cluster 32 shown in FIG. 3 may also be integrally formed with the transparent cover 30 by use of materials identical with each other, and thereafter, the opaque meter cluster 32 may be formed by masking painting.

In the case of the masking painting as described above, in the embodiment of FIGS. 5 and 6, a jig can be accurately abutted against the varied wall thickness portion and the gap formed portion on the border between the transparent cover 30 and the opaque meter cluster 32, so that necessity of accurate application of masking tapes can be eliminated, thereby enabling an expected improvemovement in efficiency in the painting work.

Furthermore, in the above-described embodiments, description has been given of the construction wherein the top end portion of the opaque meter cluster 32 and the bottom end portion of the transparent cover 30 are connected to each other to cover the front surface of the lower portion of the meter case. However, the above construction may be replaced by a construction wherein both the transparent cover 30 and the opaque meter cluster 32 as shown in FIG. 3 may be replaced only by the transparent cover 30, and the lower portion of this transparent cover 30 may be covered by an opaque meter cluster separately provided.

As has been described hereinabove, in the combination meter cover construction according to the present invention, the front surface of the lower portion of the meter case is covered by the opaque meter cluster secured to the meter case and the meter hood is disposed close to the upper portion of the front face of the meter case to cover the upper portion of the front surface of the meter case, so that the design around the pointer of the meter can be arranged with a clean-cut shape and, mechanical interference between the meter cluster and the main body of meter is prevented from occurring so as to obviate generation of noises advantageously.

What is claimed is:

1. A combination meter cover construction for covering a combination meter secured to an instrument panel for use in a vehicle, comprising:
    a meter case incorporating therein a main body a meter;
    a transparent cover provided at the forward portion of said meter case, for making an indicating portion of said main body of said meter visually inspectable from outside, said transparent cover being formed with an inclined portion extending into a compartment and forming a moderate curve obliquely downwardly;
    a meter hood disposed close to a front face of the upper portion of the transparent cover, for covering a front face of an upper portion of said meter case; and
    a meter cluster interposed between a lower portion of said transparent cover and said meter case for supporting the lower portion of said transparent cover on said meter case, said meter cluster being provided with a vertical rectilinear portion contiguous to an inclined portion thereof connected to said inclined portion of the transparent cover such that said meter cluster is coplanar with said transparent cover so that an indicating portion of the meter can be readily inspected.

2. A combination meter cover construction as set forth in claim 1, wherein a top end portion of said meter cluster is of equal wall thickness as that of a bottom end portion of said transparent cover.

3. A combination meter cover construction as set forth in claim 1, wherein said meter cluster connected to said inclined portion of said transparent cover is disposed on a line of extension of said inclined portion thereof.

4. A combination meter cover construction as set forth in claim 1, further comprising joint means for joining together said transparent cover and said meter cluster.

5. A combination meter cover construction as set forth in claim 4, wherein a horizontal rectilinear portion provided on said meter cluster is secured to said meter case through said decorative plate and said vertical rectilinear portion is connected to said horizontal rectilinear portion.

6. A combination meter cover construction as set forth in claim 1, further comprising a decorative plate secured to the forward portion of said meter case wherein said meter cluster is secured to said meter case through said decorative plate.

7. A combination meter cover construction as set forth in claim 1, wherein opposite side portions of said transparent cover are secured to the meter cluster in the same manner as the bottom end portion thereof is.

8. A combination meter cover construction as set forth in claim 1, wherein said meter hood further comprises suspended portions suspended to opposite side portions of said transparent cover, said suspended portions being disposed close to the upper and side portions of the meter cluster and shielding parts behind said instrument panel from the line of vision of an occupant.

9. A combination meter cover construction as set forth in claim 1, wherein said transparent cover has a greater wall thickness than that of the meter cluster, said transparent cover further comprises a chamferred portion is formed at a bottom end portion thereof to substantially decrease the wall thickness of said transparent cover, a small wall thickness projection is formed at the bottom end portion thus chamferred, and wherein said small thickness projection and a small wall thickness projection are joined together.

10. A combination meter cover construction as set forth in claim 1, wherein the forward end portion of a small wall thickness projection of said opaque meter cluster and the bottom portion of a rectangular cutout of said transparent cover form a gap therebetween.

11. A combination meter cover construction for covering a combination meter secured to an instrument panel for use in a vehicle, comprising:
    a meter case incorporating therein a main body of a meter;
    a transparent cover provided at the forward portion of said meter case for making an indicating portion of said main body of meter visually inspectable from outside;
    a meter hood disposed close to a front face of an upper portion of the transparent cover, for covering a front face of an upper portion of said meter case, said meter hood being formed with suspended portions suspended to opposite side portions of said transparent cover; and
    a meter cluster interposed between a lower portion of said transparent cover and said meter case for supporting the lower portion of said transparent cover onto said meter case, the upper and side portions of said meter cluster being positioned close to said suspended portions of said meter hood to shield parts located behind said instrument panel from the line of vision of an occupant, such that said meter cluster is coplanar with said transparent cover so that an indicating portion of the meter can be readily inspected.

12. A combination meter cover construction for a vehicle, comprising:
    a meter case incorporating therein a main body of a meter;
    a decorative plate provided at a forward portion of said meter case for exposing an indicating portion of said main body through an opening formed in said decorative plate;
    a transparent cover affixed to a forward portion of said decorative plate;
    a meter hood disposed close to a front face of an upper portion of said transparent cover for covering a front face of an upper portion of said meter case; and
    an opaque meter cluster for connecting a side portion and an inclined portion at the bottom end of said transparent cover to said decorative plate, said opaque meter cluster having an inclined portion disposed on a line of extension of said inclined portion at the bottom end of said transparent cover wherein said meter cluster further comprises a vertical rectilinear portion contiguous to said inclined portion to eliminate an impression that said indicating portion is disposed in a secluded position.

13. A combination meter cover construction as set forth in claim 12, wherein said inclined portion of the meter cluster and said inclined portion of the transparent cover are of equal wall thickness.

14. A combination meter cover construction as set forth in claim 13, further comprising means for joining together said meter cluster and said transparent cover are joined together.

15. A combination meter cover construction as set forth in claim 12, wherein opposite side portions of said meter cluster as viewed from a driver are connected to opposite side portions of said transparent cover.

16. A combination meter cover construction comprising:
 a meter case;
 a transparent cover positioned at a forward portion of said meter case; and
 an opaque meter cluster secured to a lower portion of a front face of said meter case so as to cover the lower portion of the front face of the meter case;
 a meter hood is disposed in close proximity to the front face of the upper portion of said transparent cover to cover the upper portion of the front face of the meter case, said transparent cover having a greater wall thickness than said opaque meter cluster, wherein the forward end portion of said transparent cover is chamfered, reduced in wall thickness and connected to said meter cluster.

17. A combination meter cover construction as set forth in claim 16, wherein a top end portion of said meter cluster and a bottom end portion of said transparent cover are of equal wall thickness.

18. A combination meter cover construction as set forth in claim 16, wherein opposite side portions of said transparent cover are secured to said opaque meter cluster in the same manner as the bottom end portion thereof is.

19. A combination meter cover construction as set forth in claim 16, wherein the forward end portion of the small wall thickness projection of said opaque meter cluster and the bottom portion of a rectilinear cutout of said transparent cover form a gap therebetween.

* * * * *